(12) United States Patent
Wu et al.

(10) Patent No.: US 11,112,647 B2
(45) Date of Patent: Sep. 7, 2021

(54) DISPLAY DEVICE, DRIVING METHOD AND ELECTRONIC APPARATUS

(71) Applicant: Xiamen Tianma Micro-Electronics Co., Ltd., Xiamen (CN)

(72) Inventors: Ling Wu, Xiamen (CN); Boping Shen, Xiamen (CN)

(73) Assignee: Xiamen Tianma Micro-Electronics Co., Ltd., Xiamen (CN)

(*) Notice: Subject to any disclaimer, the term of this patent is extended or adjusted under 35 U.S.C. 154(b) by 0 days.

(21) Appl. No.: 16/372,515

(22) Filed: Apr. 2, 2019

(65) Prior Publication Data

US 2019/0227383 A1 Jul. 25, 2019

(30) Foreign Application Priority Data

Nov. 2, 2018 (CN) .......................... 201811301161.9

(51) Int. Cl.
*G02F 1/13357* (2006.01)
*G02F 1/1362* (2006.01)
(Continued)

(52) U.S. Cl.
CPC ...... *G02F 1/133603* (2013.01); *G02F 1/1368* (2013.01); *G02F 1/133621* (2013.01);
(Continued)

(58) Field of Classification Search
CPC ......... G02F 1/133603; G02F 1/133621; G02F 1/136286; G02F 1/1368;
(Continued)

(56) References Cited

U.S. PATENT DOCUMENTS

2009/0153773 A1* 6/2009 Kuroda ................ G09G 3/3426
349/62
2009/0244440 A1* 10/2009 Ohashi .............. G02F 1/133632
349/68
(Continued)

FOREIGN PATENT DOCUMENTS

CN 201369152 Y 12/2009
CN 105609058 A 5/2016
(Continued)

OTHER PUBLICATIONS

Office Action of Chinese Patent Application No. 201811301161.9 dated Nov. 13, 2019.
(Continued)

*Primary Examiner* — Nathanael R Briggs
(74) *Attorney, Agent, or Firm* — Kilpatrick Townsend & Stockton LLP

(57) ABSTRACT

The present disclosure provides a display device, a driving method, and an electronic apparatus. The display device includes a backlight module including a substrate and a plurality of LEDs disposed on the substrate, and the plurality of LEDs being configured to emit light having at least one color of red, green, and blue; and a display panel, configured to display red light when the plurality of LEDs emits red light, to display green light when the plurality of LEDs emits green light, and to display blue light when the plurality of LEDs emits blue light. The display device does not require a color resist layer, thereby greatly improving the light transmittance of the display device.

12 Claims, 11 Drawing Sheets

(51) Int. Cl.
*G02F 1/1368* (2006.01)
*G09G 3/34* (2006.01)
*G09G 3/36* (2006.01)
*G02F 1/1335* (2006.01)

(52) U.S. Cl.
CPC ..... *G02F 1/136286* (2013.01); *G09G 3/3413* (2013.01); *G09G 3/3426* (2013.01); *G02F 1/133622* (2021.01); *G02F 1/133624* (2021.01); *G02F 2203/30* (2013.01); *G09G 3/3648* (2013.01); *G09G 2310/0235* (2013.01)

(58) Field of Classification Search
CPC ........ G02F 2001/133622; G02F 2001/133624; G02F 2203/30; G09G 3/3413; G09G 3/3426; G09G 3/3648; G09G 2310/0235
See application file for complete search history.

(56) References Cited

U.S. PATENT DOCUMENTS

2010/0033111 A1\* 2/2010 Miner ............... G02F 1/133621
   315/294
2019/0108798 A1\* 4/2019 Ishihara ............... G09G 3/3426

FOREIGN PATENT DOCUMENTS

CN    107633822 A    1/2018
WO    2017164080 A1  9/2017

OTHER PUBLICATIONS

Office Action of Chinese Patent Application No. 201811301161.9 dated Jun. 24, 2020.

\* cited by examiner

DISPLAY DEVICE, DRIVING METHOD AND ELECTRONIC APPARATUS

CROSS-REFERENCE TO RELATED APPLICATIONS

The present application claims priority to Chinese Patent Application No. 201811301161.9, filed on Nov. 2, 2018, the content of which is incorporated herein by reference in its entirety.

FIELD

The present disclosure relates to the field of liquid crystal display technologies, and particularly, to a display device, a driving method, and an electronic apparatus.

BACKGROUND

A Liquid Crystal Display (LCD) using a Mini-Light Emitting Diode (Mini-LED) as backlight is a new generation of the display technology. Compared with the LCD using a conventional LED as backlight in the related art, the LCD using the Mini-LED as backlight has been widely used in display fields such as cellphones, notebook computers and televisions, due to its advantages of high resolution, high brightness, super power saving, fast response, high light-emitting efficiency and long service life, and the like.

A backlight module of the common Mini-LED adopts blue LED array chip, and a display panel includes a color film substrate. Color resists are arranged on the color film substrate to emit red light, green light and blue light.

However, since the color resists are arranged on the color film substrate of the display panel, the display device has a relatively low transmittance.

SUMMARY

In view of this, the present disclosure provides a display device, a driving method, and an electronic apparatus, in order to solve the above problem.

In one embodiment of the present disclosure provides a display device. The display device includes a backlight module and a display panel. The backlight module includes a substrate, and a plurality of LEDs disposed on the substrate and configured to emit at least one color of red light, green light, and blue light. The display panel is configured to display red light when the plurality of LEDs emits red light, display green light when the plurality of LEDs emits green light, and display blue light when the plurality of LEDs emits blue light.

In another embodiment the present disclosure provides a driving method that is applied to the display device described above. The driving method includes: controlling the backlight module to emit red light during a first time period, controlling the backlight module to emit green light during a second time period, and controlling the backlight module to emit blue light during a third time period; and controlling the display panel to display red light during a fourth time period, controlling the display panel to display green light during a fifth time period, and controlling the display panel to display blue light during a sixth time period.

In another embodiment the present disclosure provides an electronic apparatus including the display device according to one embodiment.

BRIEF DESCRIPTION OF DRAWINGS

Embodiments of the present disclosure are described in the accompanying drawings which are used in the description of the embodiments and are briefly introduced as follows.

DESCRIPTION OF EMBODIMENTS

Embodiments of the present disclosure are described in the following with reference to the accompanying drawings. It should be understood that the described embodiments are merely exemplary embodiments of the present disclosure, which shall not be interpreted as providing limitations to the present disclosure.

Figure 1:
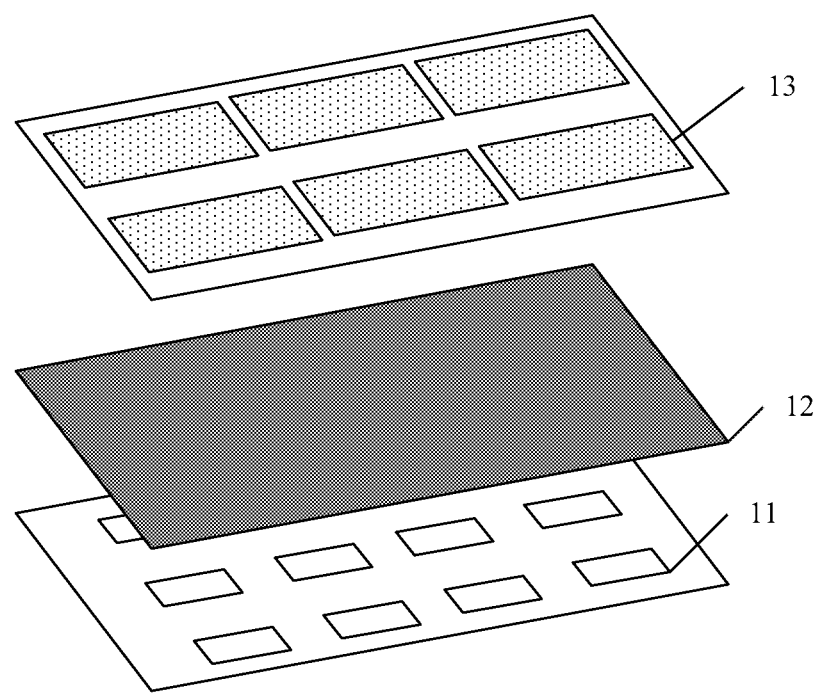
FIG. 1 is a schematic structural diagram illustrating a Mini-LED as backlight in the related art.

FIG. 1 is a schematic structural diagram illustrating a Mini-LED as backlight in the related art. With reference to FIG. 1, a conventional backlight module adopts a blue LED array chip 11 for emitting blue backlight, and displays white light through a RG fluorescent film 12 (that is formed by mixing a red fluorescent powder and a green fluorescent powder). Finally, a color resist layer 13 is formed on a color film substrate of the display panel. The color resist layer 13 usually includes a red color resist, a green color resist and a blue color resist, so that the component can emit red, green and blue light and then light having different colors can be emitted after mixing. However, due to the presence of the color resist layer 13, the component may have a reduced light transmittance, which deteriorates the image quality.

In order to solve the above problem, the embodiments of the present disclosure provide a display device, which can greatly increase the light transmittance of the display device and achieves a better image quality.

Figure 2:
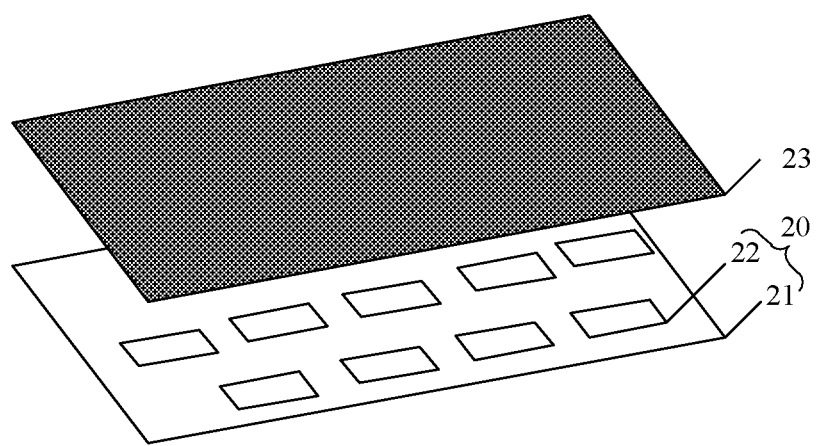
FIG. 2 is a schematic structural diagram of a display device according to an embodiment of the present disclosure.

FIG. 2 is a schematic structural diagram of a display device according to an embodiment of the present disclosure. With reference to FIG. 2, the display device includes a display panel 23 and a backlight module 20.

The backlight module 20 includes a substrate 21, and a plurality of LEDs 22 disposed on the substrate 21. The plurality of LEDs 22 is configured to emit at least one of red light, green light, and blue light.

The display panel 23 is configured to display red light when the LEDs 22 emit red light, display green light when the LEDs 22 emit green light, and display blue light when the LEDs 22 emit blue light.

In this embodiment, the backlight module 20 can directly emit at least one of red light, green light, and blue light. Correspondingly, the display panel 23 displays red light when the backlight module 20 emits red light, displays green light when the backlight module 20 emits green light, and displays blue light when the backlight module 20 emits blue light.

In other words, a color resist layer can be omitted in the display panel 23, thereby greatly improving the light transmittance of the display device and achieving a better image quality.

It should be noted that the substrate 21 is usually a wiring substrate on which the wiring arranged to form an external connection of signal and electricity. The wiring is configured to transmit a signal for driving the LEDs 22 to emit light. Moreover, in this embodiment, the LEDs 22 are Mini-LED, which has a smaller size than a common LED. The size of the Mini-LED in a range of 100 µm to 1000 µm is conducive to achieving a High Dynamic Range (HDR) image. Thus, the liquid crystal display device can have advantages such as high dynamic contrast, better image quality display, etc.

Figure 3:
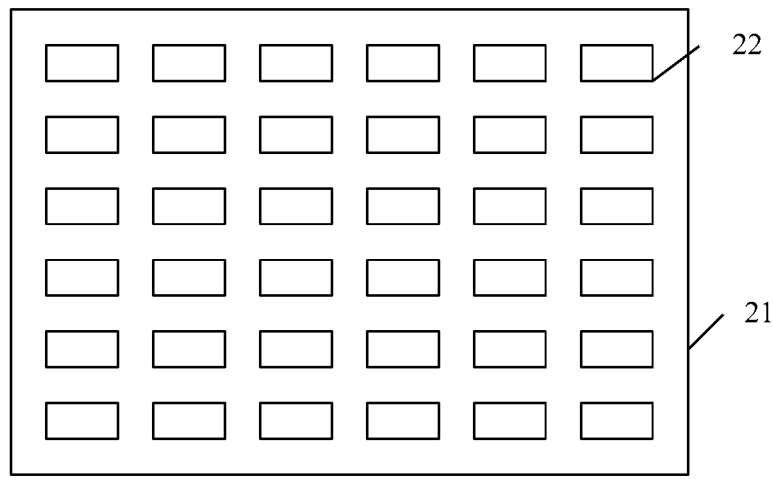
FIG. 3 is a schematic diagram illustrating an arrangement of a plurality of LEDs in a backlight module according to an embodiment of the present disclosure.

FIG. 3 is a schematic diagram illustrating an arrangement of a plurality of LEDs in a backlight module according to an embodiment of the present disclosure. With reference to FIG. 3, in the backlight module 20, the plurality of LEDs 22 is arranged in an array on the substrate 21.

In the present embodiment, arranging the plurality of LEDs 22 in an array allows the light from the LEDs 22 to be uniformly transmitted to the entire display panel 23.

Furthermore, a wiring arrangement of a control circuit of the LEDs 22 can be simplified, thereby reducing the manufacturing difficulty of the backlight module 20.

Figure 4:
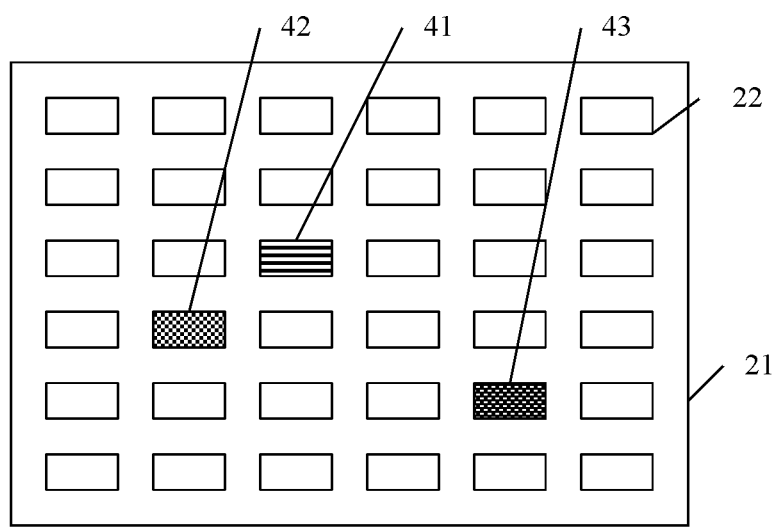
FIG. 4 is another schematic diagram illustrating an arrangement of a plurality of LEDs in a backlight module according to an embodiment of the present disclosure.

FIG. 4 is another schematic diagram illustrating an arrangement of a plurality of LEDs in a backlight module according to an embodiment of the present disclosure. With reference to FIG. 4, the plurality of LEDs 22 includes at least one red LED 41, at least one green LED 42, and at least one blue LED 43.

In this embodiment, since the backlight module 20 may be required to emit red light, green light, and blue light, the plurality of LEDs 22 includes at least one red LED 41 configured to emit red light, at least one green LED 42 configured to emit green light, and at least one blue LED 43 configured to emit blue light.

It should be noted that the number of the red LEDs 41, the number of the green LEDs 42, and the number of the blue LEDs 43 can be set according to parameters such as light intensity and power, and is not specifically limited in the embodiments of the present disclosure.

In an embodiment, the LEDs 22 can also be LEDs that emit red or blue or green light. In this case, all of such LEDs only need to be arranged in an array.

Figure 5:
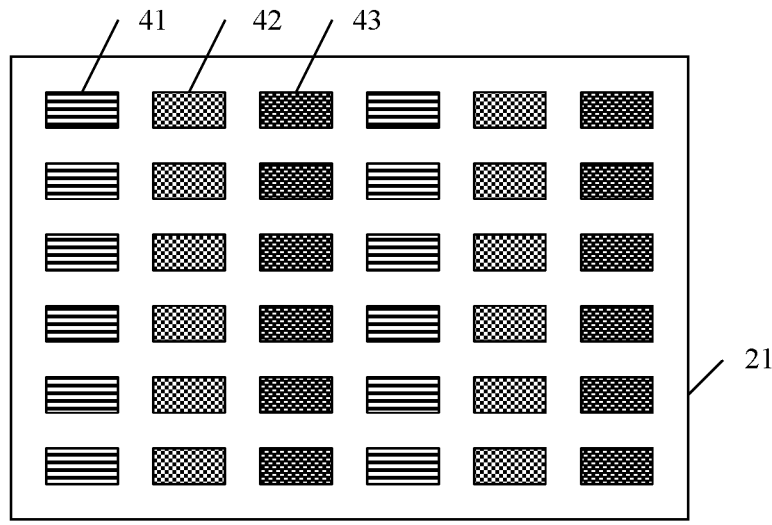
FIG. 5 is yet another schematic diagram illustrating an arrangement of a plurality of LEDs in a backlight module according to an embodiment of the present disclosure.

FIG. 5 is yet another schematic diagram illustrating an arrangement of a plurality of LEDs in a backlight module according to an embodiment of the present disclosure. With reference to FIG. 5, in a row direction of an array, the plurality of LEDs 22 is arranged in a repeated sequence of a red LED 41, a green LED 42, and a blue LED 43.

In this embodiment, since the red LED 41, the green LED 42 and the blue LED 43 are repeatedly arranged in a sequence in the row direction of the array, the display panel 23 can have a same display brightness for each color in the row direction. Thus, weak light will not occur, and the image quality of the display device can be improved.

Figure 6:
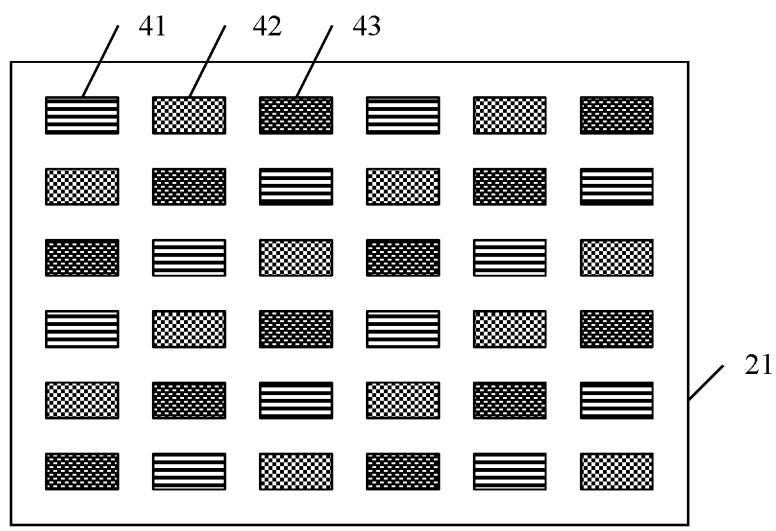
FIG. 6 is yet another schematic diagram illustrating an arrangement of a plurality of LEDs in a backlight module according to an embodiment of the present disclosure.

FIG. 6 is yet another schematic diagram illustrating an arrangement of a plurality of LEDs in a backlight module according to an embodiment of the present disclosure. With reference to FIG. 6, in a column direction of an array, the plurality of LEDs 22 is arranged in a repeated sequence of a red LED 41, a green LED 42 and a blue LED 43.

In this embodiment, since the red LED 41, the green LED 42 and the blue LED 43 are repeatedly arranged in a sequence in the column direction, the display panel 23 can have a same display brightness for each color in the column direction. Thus, weak light will not occur, and the image quality of the display device can be improved.

It can be concluded from the above description that, when the red LED 41, the green LED 42 and the blue LED 43 are repeatedly arranged in a sequence both in the row direction and the column direction of the array, i.e., the arrangement manner as shown in FIG. 6, the display brightness for each color in each pixel of the display panel 23 can be uniform to the maximum extent. Thus, weak light will not occur, and the image quality of the display device can be improved.

Figure 7:
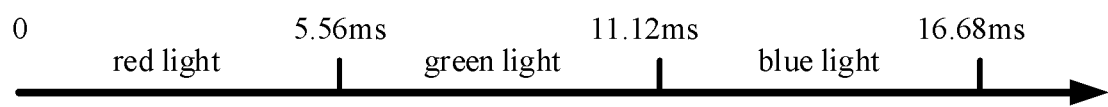
FIG. 7 is a sequence diagram of LED light emission according to an embodiment of the present disclosure.

FIG. 7 is a sequence diagram of LED light emission according to an embodiment of the present disclosure. With reference to FIG. 7, a light-emitting duration of the red LED 41, a light-emitting duration of the green LED 42, and a light-emitting duration of the blue LED 43 are identical.

In this embodiment, for example, the red LED 41, the green LED 42 and the blue LED 43 sequentially emit light. The light-emitting duration of the red LED 41, the light-emitting duration of the green LED 42, and the light-emitting duration of the blue LED 43 are 5.56 ms. In this regards, the display device displays light having a specific color for 16.68 ms.

It should be noted that the light-emitting duration of each LED should be shorter than a reaction time of human eye for recognizing color light. That is, when the display device finally displays yellow light, the human eye can only identify yellow light, rather than these three basic color light, i.e., red, green and blue light.

Figure 8:
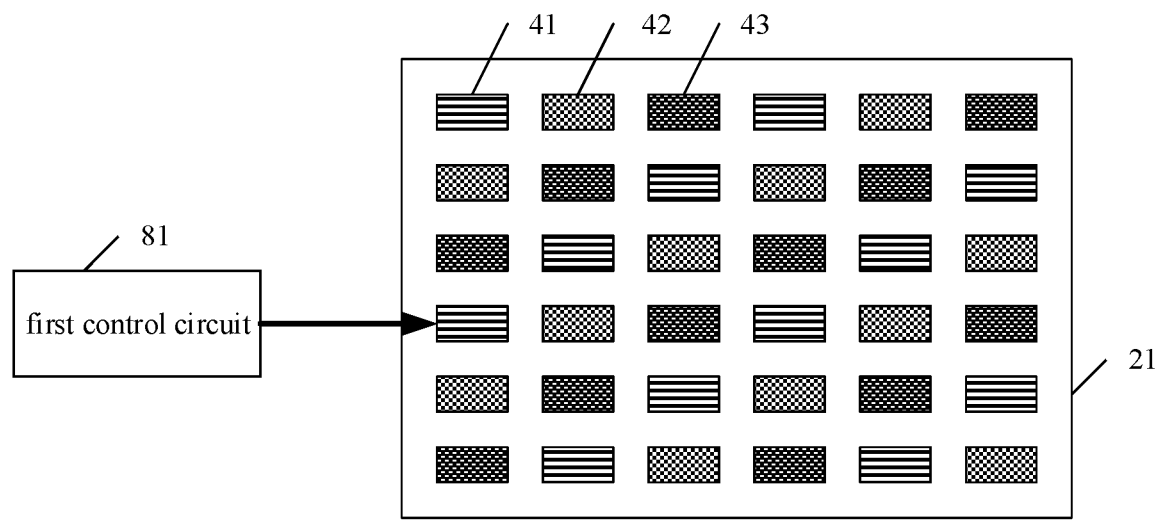
FIG. 8 is another schematic structural diagram of a display device according to an embodiment of the present disclosure.

FIG. 8 is another schematic structural diagram of a display device according to an embodiment of the present disclosure. With reference to FIG. 8, the display device further includes a first control circuit 81.

The first control circuit 81 is configured to control an operation state of the red LED 41, the green LED 42 and the blue LED 43.

When one of the red LED, the green LED, and the blue LED is in a light-emitting state, remaining ones of the red LED, the green LED, and the blue LED are in a non-light-emitting state In this embodiment, for example, when it may be necessary to display light having one color, the first control circuit 81 controls the red LEDs 41 to continuously emit light for 5.56 ms, then controls the green LEDs 42 to continuously emit light for 5.56 ms, and then controls the blue LEDs 43 to continuously emit light for 5.56 ms, as shown in FIG. 7.

It should be noted that a light-emitting sequence of the red LEDs 41, the green LEDs 42 and the blue LEDs 43 can be varied depending upon actual requirement, and is not limited in the embodiments of the present disclosure.

Figure 9:
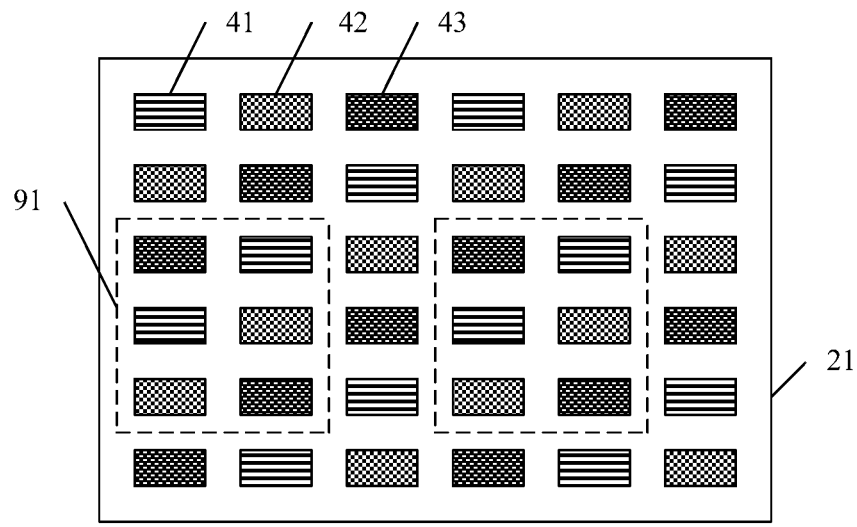
FIG. 9 is a schematic diagram illustrating a plurality of LED areas in a backlight module according to an embodiment of the present disclosure.

FIG. 9 is a schematic diagram illustrating a plurality of LED areas in a backlight module according to an embodiment of the present disclosure. With reference to FIG. 9, the plurality of LEDs is arranged in at least two light-emitting areas 91.

Figure 10:
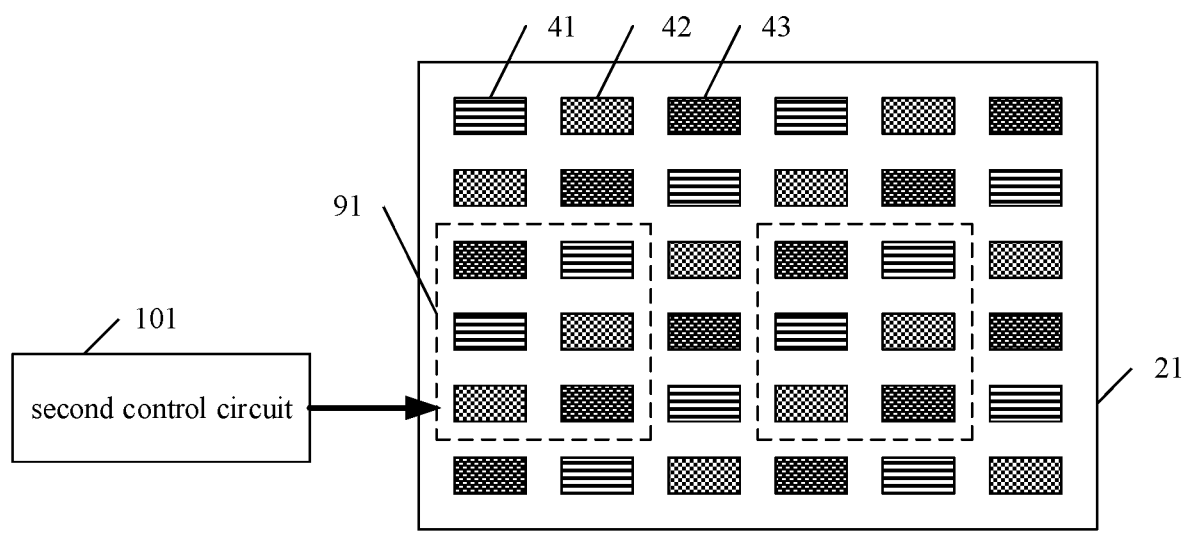
FIG. 10 is yet another schematic structural diagram of a display device according to an embodiment of the present disclosure.

FIG. 10 is still another schematic structural diagram of a display device according to an embodiment of the present disclosure. With reference to FIG. 10, the display device further includes: a second control circuit 101.

The second control circuit 101 is configured to control brightness of each light-emitting area 91.

In this embodiment, the plurality of LEDs is divided into the light-emitting areas 91, and each of the light-emitting areas 91 is separately controlled by the second control circuit 101.

In an embodiment, each LED corresponds to a respective light-emitting area, and the light-emitting state of each LED is independently controlled by the second control circuit 101.

For example, when a certain area on the display panel needs to be displayed as black, all the LEDs disposed in the light-emitting area corresponding to this certain area are controlled in a non-light-emitting state. When a certain area on the display panel needs to be continuously displayed as red in a specified period, only the red LEDs located in the light-emitting area corresponding to this certain area are controlled to emit light in the specified period, while other LEDs do not emit light.

It should be noted that the first control circuit 81 and the second control circuit 101 can be a same control circuit adopting different controlling methods. In this embodiment, the first control circuit and the second control circuit are only provided as examples, but not intended to constitute limitations.

Figure 11:
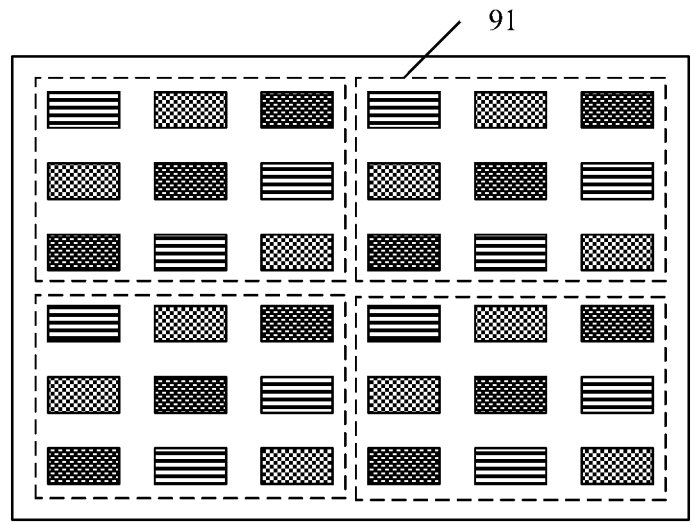
FIG. 11 is a schematic diagram of an arrangement of LEDs in light-emitting areas according to an embodiment of the present disclosure.

FIG. 11 is a schematic diagram of an arrangement of LEDs in each light-emitting area according to an embodiment of the present disclosure. With reference to FIG. 11, each light-emitting area 91 is provided with a same number of LEDs.

In addition, each light-emitting area 91 includes at least one red LED 41, at least one green LED 42, and at least one blue LED 43.

In this embodiment, the purpose of providing each light-emitting area 91 with a same number of LEDs is to effectively reduce the difficulty of controlling the light-emitting areas in a case of regular division.

Furthermore, when each light-emitting area 91 is provided with at least one red LED 41, at least one green LED 42 and at least one blue LED 43, each light-emitting area 91 can emit light having three primary colors. In other words, the display panel corresponding to each light-emitting area 91 can display light having several different colors.

Figure 12:
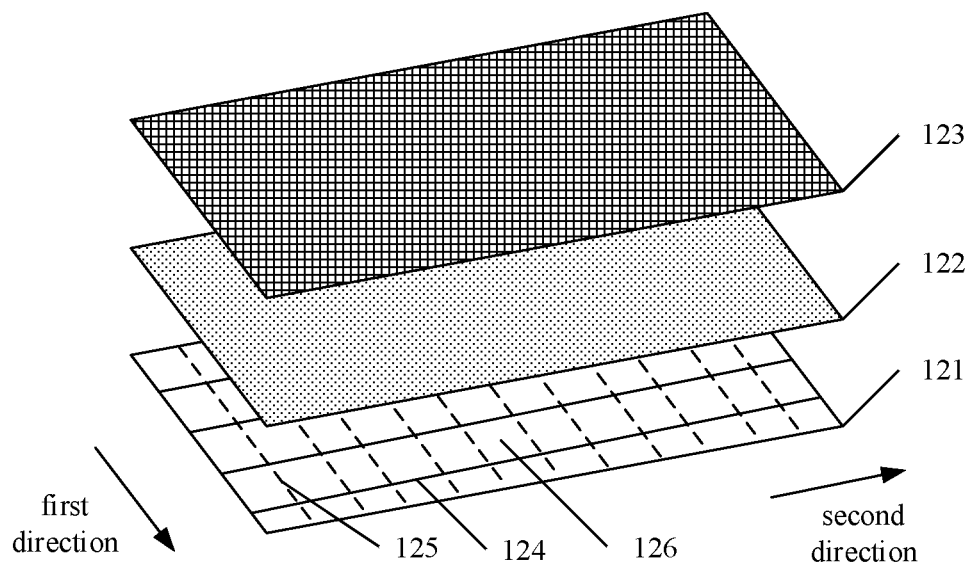
FIG. 12 is a schematic structural diagram of a display panel according to an embodiment of the present disclosure.

FIG. 12 is a schematic structural diagram of a display panel according to an embodiment of the present disclosure. With reference to FIG. 12, the display panel includes a liquid crystal layer 122, an array substrate 121 and an opposite substrate 123.

The array substrate 121 includes a display area having a plurality of scan lines 124 and a plurality of data lines 125. The plurality of scan lines 124 is arranged in parallel along a first direction, and the plurality of data lines 125 is arranged in parallel along a second direction. The plurality of scan lines 124 intersects with the plurality of data lines 125 in an insulation manner to define a plurality of pixels 126.

The opposite substrate 123 is designed in a conventional way, except a color resist layer is no longer required to be disposed on the opposite substrate 123.

Figure 13:
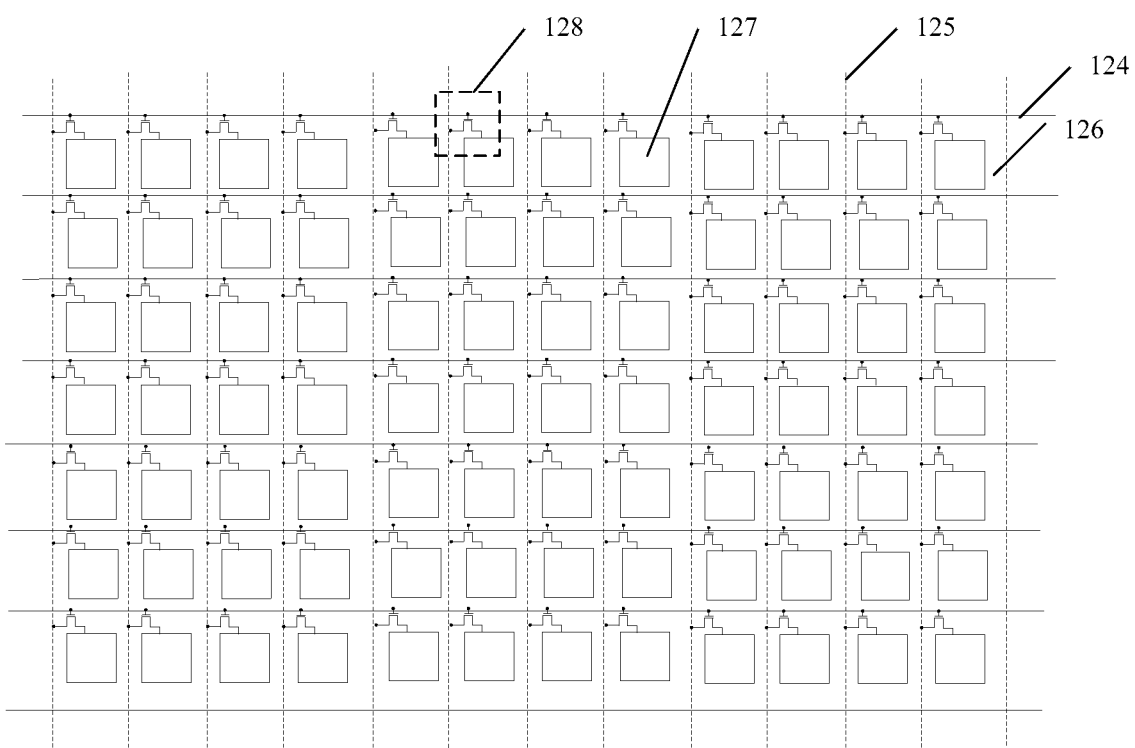
FIG. 13 is a schematic structural diagram of an array substrate according to an embodiment of the present disclosure.

FIG. 13 is a schematic structural diagram of an array substrate according to an embodiment of the present disclosure. With reference to FIG. 13, each pixel 126 corresponds to a respective one thin film transistor 128. Herein, each thin film transistor 128 has a gate electrode connected to the scan line 124, and a source electrode connected to the data line 125, and a drain electrode connected to a pixel electrode 127.

The display area has a length of x in the first direction, and a length of y in the second direction. The pixel 126 has a length of a in the first direction, and a length of b in the second direction, where the first direction intersects with the second direction.

The display panel has a display resolution of m×n, where $$\frac{x}{m} : \frac{y}{n} = \frac{a}{b}.$$

In other words, when the display resolution of the display panel is m×n, m pixels 126 are arranged in the first direction, and n pixels 126 are arranged in the second direction.

In this embodiment, the first direction further can be perpendicular to the second direction.

In the color resist layer provided in the related art, each color resist unit represents one sub-pixel unit. In order to emit light having different colors, a pixel unit is formed by a red sub-pixel unit, a green sub-pixel unit and a blue sub-pixel unit.

In this embodiment, since a color resist layer is no longer required and the backlight module itself can emit red light, green light and blue light, one pixel 126 in the display panel can replace three sub-pixels in the related art.

Furthermore, in the related art, each sub-pixel unit is controlled by a respective one thin film transistor. In this regard, for a display panel in which the pixel unit is formed by a red sub-pixel unit, a green sub-pixel unit and a blue sub-pixel unit, three thin film transistors are needed to control each pixel unit. In contrast, in this embodiment of the present disclosure, only one thin film transistor 128 may be required to control each pixel 126. Therefore, compared with the related art, two-thirds of the thin film transistors in the array substrate can be omitted, thereby greatly simplifying the production process and reducing the production cost.

Figure 14:
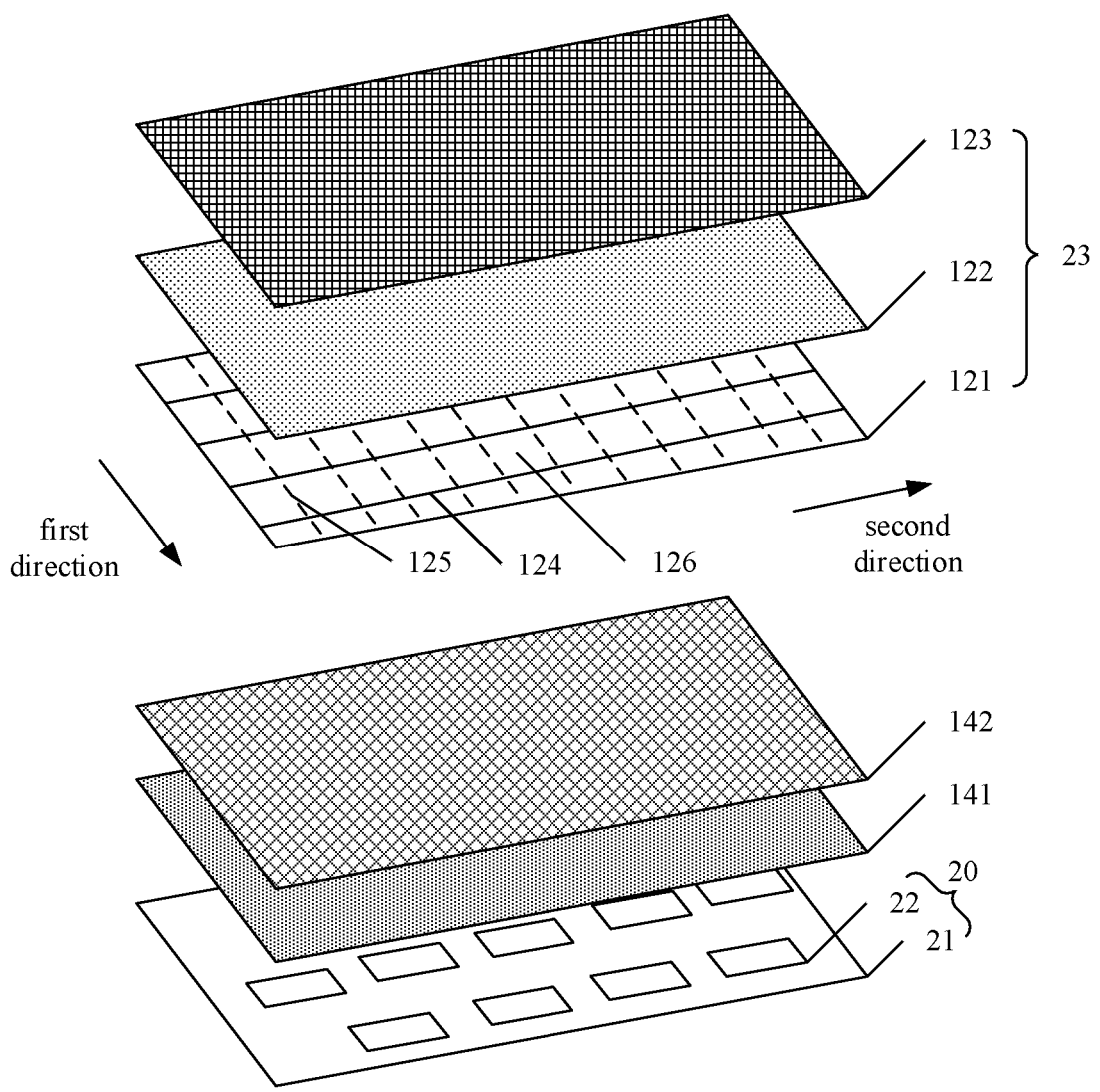
FIG. 14 is yet another schematic structural diagram of a display device according to an embodiment of the present disclosure.

FIG. 14 is yet another schematic structural diagram of a display device according to an embodiment of the present disclosure. With reference to FIG. 14, the display device further includes a diffusion sheet 141 and a structure film 142 that are disposed between the display panel 23 and the backlight module 20.

The diffusion sheet 141 is configured to diffuse light emitted from the backlight module 20, and the structure film 142 is configured to perform uniformization processing on the light diffused by the diffusion sheet 141.

It should be noted that other optical film layers also can be disposed between the display panel 23 and the backlight module 20 to process the light emitted from the backlight module 20, so as to improve the emitted light quality.

Figure 15:
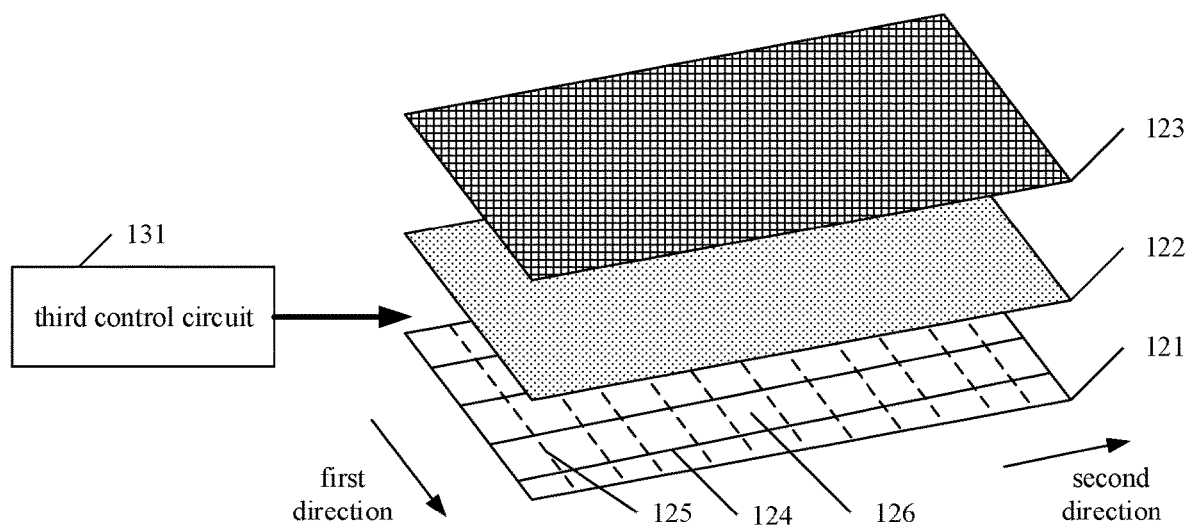
FIG. 15 is yet another schematic structural diagram of a display device according to an embodiment of the present disclosure.

FIG. 15 is yet another schematic structural diagram of a display device according to an embodiment of the present disclosure. With reference to FIG. 15, the display device further includes a third control circuit 131.

The third control circuit 131 is configured to control an operation state of the thin film transistor, so as to control to control a gray level of red light, green light or blue light passing through the liquid crystal layer 122.

In this embodiment, the third control circuit 131 controls an operation state of the thin film transistor, and thus controls the liquid crystal layer 122, so as to control a gray level of red light, green light or blue light passing through the liquid crystal layer 122.

Figure 16:
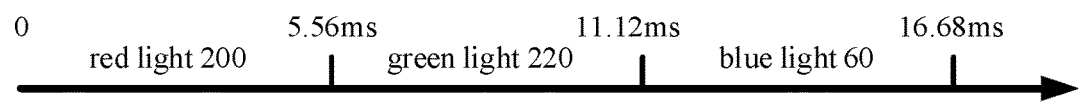
FIG. 16 is a sequence diagram of a display device displaying yellow light according to an embodiment of the present disclosure.

FIG. 16 is a sequence diagram of the display device displaying yellow light according to an embodiment of the present disclosure. With reference to FIG. 16, when the first control circuit 81 controls the red LED 41 to continuously emit light for 5.56 ms, the third control circuit 131 controls the liquid crystal layer 122 to deflect in a period of 0 to 5.56 ms, so as to make the gray level of the red light at 200. When the first control circuit 81 controls the green LED 42 to continuously emit light for 5.56 ms, the third control circuit 131 controls the liquid crystal layer 122 to deflect in a period of 5.56 to 11.12 ms, so as to make the gray level of the green light at 220. When the first control circuit 81 controls the blue LED 43 to continuously emit light for 5.56 ms, the third control circuit 131 controls the liquid crystal layer 122 to be deflect in a period of 11.12 to 16.68 ms, so as to make the gray level of the blue light at 60. Finally, the display device displays yellow light.

It can be seen from the above description that the display device provided by the embodiments of the present disclosure can display light having a desired color without providing the color resist layer, and can increase the transmittance of light, while reducing the process and cost of production.

Figure 17:
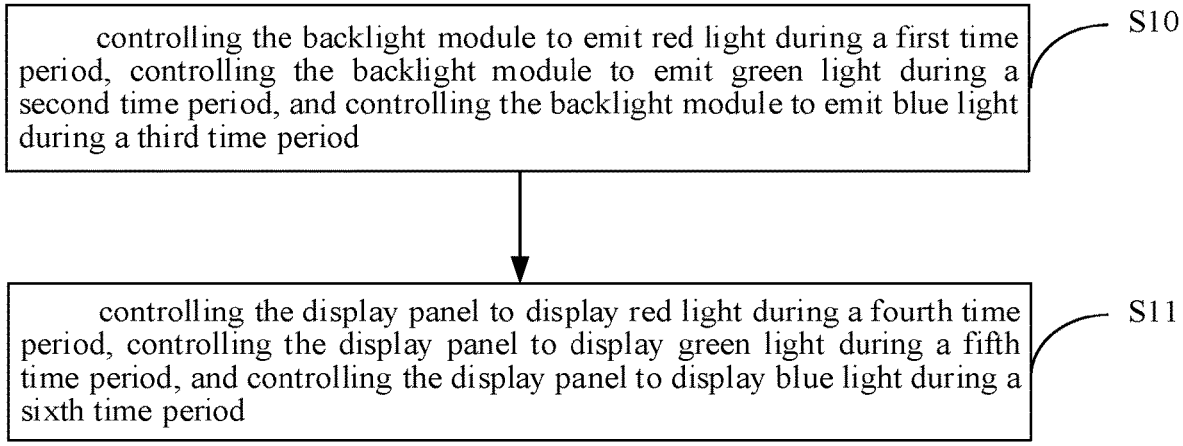
FIG. 17 is a flowchart of a driving method according to an embodiment of the present disclosure.

Based on the above embodiments of the present disclosure, an embodiment of the present disclosure further provides a driving method applied to the display device described above. FIG. 17 is a flowchart of a driving method according to an embodiment of the present disclosure. With reference to FIG. 17, the driving method includes following steps.

S10, the backlight module is controlled to emit red light during a first time period, emit green light during a second time period, and emit blue light during a third time period.

In S10, the first time period, the second time period, and the third time period have a same duration. For example, all of the first time period, the second time period, and the third time period last for 5.56 ms. The light-emitting states of the red LEDs, the green LEDs, and the blue LEDs are controlled by controlling the first control circuit.

S11, the display panel is controlled to emit red light during a fourth time period, emit green light during a fifth time period, and emit blue light during a sixth time period.

In S11, the fourth time period, the fifth time period, and the sixth time period have a same duration. In addition, the fourth time period is shorter than or equal to the first time period, the fifth time period is shorter than or equal to the second time period, and the sixth time period is shorter than or equal to the third time period. For example, all of the fourth time period, the fifth time period, and the sixth time period last for 5.56 ms. The gray levels of the red light, the green light, and the blue light are controlled by controlling the third control circuit, so as to display light having different colors.

It should be noted that, in order to achieve a better display effect, the first control circuit and the third control circuit are driven with a frequency of 180 Hz to 360 Hz, which is not limited thereto.

In the related art, when driving with a frequency of 60 Hz, the display device needs 16.68 ms to produce light having a certain color by simultaneously emitting red light, green light, and blue light through the color resist layer. In the present disclosure, since the backlight module emits red light, green light, and blue light in a time-division manner and thus forms light having a certain color, the red LED, the green LED and the blue LED are driven to emit light with a frequency of at least 180 Hz, so that the display device according to the present disclosure needs 16.68 ms to display light having a certain color.

Figure 18:
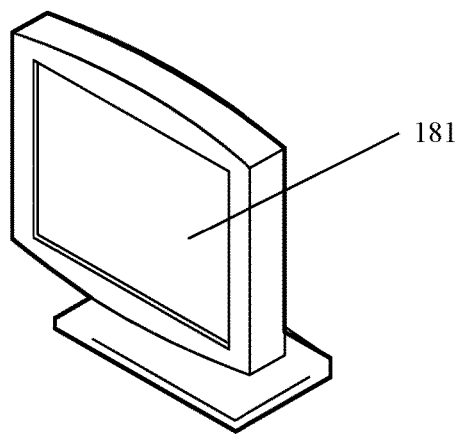
FIG. 18 is a schematic diagram of an electronic apparatus according to an embodiment of the present disclosure.

Based on the above embodiments of the present disclosure, an embodiment of the present disclosure further provides an electronic apparatus. FIG. 18 is a schematic diagram of an electronic apparatus according to an embodiment of the present disclosure. With reference to FIG. 18, the electronic apparatus 181 includes the display device described above.

The electronic apparatus is, but not limited to, a vehicle-mounted display screen, a television, etc.

The display device, the driving method and the electronic apparatus provided by the present disclosure have been described in details above. The principle and implementation of the present disclosure have been described through some exemplary embodiments. It should be noted that the description of the above embodiments are merely intended to assist in understanding the method and main content of present disclosure.

It should be noted that the various embodiments in the present specification are described in a progressive manner, and each embodiment focuses on differences from other embodiments, and the same and similar parts between the various embodiments can be referred to each other. With respect to the device disclosed in each embodiment, since it corresponds to the method disclosed in the embodiment, the description thereof is relatively simple and the relevant part can be referred to the method.

It should also be noted that, in this context, relational terms such as "first", "second", and the like are used merely to distinguish one entity or one operation from another entity or another operation, but not to require or imply any such actual relationship or order thereof. Furthermore, the terms "comprise", "include", "contain" or other variations are intended to include elements in a non-exclusive manner. That is, an expression that a process, a method, an item or an equipment comprise a series of elements means that not only those elements are included, but also other elements that are not explicitly listed, or inherent element of the process, the method, the item or an the equipment are included. The phrase "including one" does not exclude that other elements are also included in the item or equipment.

What is claimed is:

1. A display device, comprising:
    a backlight module comprising: a substrate; and a plurality of light-emitting diodes (LEDs) disposed on the substrate, wherein the plurality of LEDs comprises red LEDs configured to emit red light, green LEDs configured to emit green light, and blue LEDs configured to emit-blue light; and
    a display panel configured to display red light when the plurality of LEDs emits red light, display green light when the plurality of LEDs emits green light, and display blue light when the plurality of LEDs emits blue light,
    wherein the plurality of LEDs is arranged in an array comprising rows and columns,
    wherein in each of the rows of LEDs and in each of the columns of LEDs, the red LEDs, the green LEDs and the blue LEDs are arranged in a repeated linearly aligned sequence of LEDs,
    wherein a time period during which the display panel is controlled to display red light is shorter than or equal to a time period during which the backlight module is controlled to emit red light, a time period during which the display panel is controlled to display green light is shorter than or equal to a time period during which the backlight module is controlled to emit green light, and a time period during which the display panel is controlled to display blue light is shorter than or equal to a time period during which the backlight module is controlled to emit blue light,
    wherein the linearly aligned sequence comprises a red LED immediately followed by one of:
    A) a green LED immediately followed by a blue LED, and
    B) a blue LED immediately followed by a green LED.

2. The display device according to claim 1, wherein the red LED, the green LED, and the blue LED have a same light-emitting duration.

3. The display device according to claim 1, further comprising a first control circuit configured to control operation states of the red LED, the green LED, and the blue LED,
    wherein when one of the red LED, the green LED, and the blue LED is in a light-emitting state, remaining ones of the red LED, the green LED, and the blue LED are in a non-light-emitting state.

4. The display device according to claim 1, wherein a number of LEDs of the plurality of LEDs arranged in each of at least two light-emitting areas are identical.

5. The display device according to claim 1, further comprising a liquid crystal layer and an array substrate,
    wherein the array substrate comprises a display area having a plurality of scan lines and a plurality of data lines, the plurality of scan lines is arranged in parallel in a first direction, the plurality of data lines is arranged in parallel in a second direction, and the plurality of scan lines intersects with the plurality of data lines in an insulation manner to define a plurality of pixels;
    each of the plurality of pixels corresponds to a respective one thin film transistor;
    the display area has a length of x in the first direction and a length of y in the second direction; each of the plurality of pixels has a length of a in the first direction and a length of b in the second direction, and the first direction intersects with the second direction; and
    the display panel has a display resolution of m×n, where $$\frac{x}{m} : \frac{y}{n} = \frac{a}{b}.$$

6. The display device according to claim 5, further comprising a third control circuit configured to control an operation state of the thin film transistor, so as to control a gray level of red light, green light or blue light passing through the liquid crystal layer.

7. A driving method, applied to a display device comprising:
    a backlight module comprising: a substrate; and a plurality of light-emitting diodes (LEDs) disposed on the substrate, wherein the plurality of LEDs comprises red LEDs configured to emit red light, green LEDs configured to emit green light, and blue LEDs configured to emit-blue light; and
    a display panel configured to display red light when the plurality of LEDs emits red light, display green light when the plurality of LEDs emits green light, and display blue light when the plurality of LEDs emits blue light,
    wherein the plurality of LEDs is arranged in an array comprising rows and columns, and
    wherein in each of the rows of LEDs and in each of the columns of LEDs, the red LEDs, the green LEDs and the blue LEDs are arranged in a repeated linearly aligned sequence of LEDs,
    wherein the linearly aligned sequence comprises a red LED immediately followed by one of:
    A) a green LED immediately followed by a blue LED, and
    B) a blue LED immediately followed by a green LED,
    wherein the driving method comprises:
    controlling the backlight module to emit red light during a first time period, controlling the backlight module to emit green light during a second time period, and controlling the backlight module to emit blue light during a third time period; and
    controlling the display panel to display red light during a fourth time period, controlling the display panel to display green light during a fifth time period, and controlling the display panel to display blue light during a sixth time period,
    wherein the fourth time period is shorter than or equal to the first time period, the fifth time period is shorter than or equal to the second time period, and the sixth time period is shorter than or equal to the third time period.

8. The driving method according to claim 7, wherein the first time period, the second time period, and the third time period have a same duration.

9. The driving method according to claim 7, wherein the fourth time period, the fifth time period, and the sixth time period have a same duration.

10. An electronic apparatus, comprising a display device comprising:
    a backlight module comprising: a substrate; and a plurality of light-emitting diodes (LEDs) disposed on the substrate, wherein the plurality of LEDs comprises red LEDs configured to emit red light, green LEDs configured to emit green light, and blue LEDs configured to emit-blue light; and
    a display panel configured to display red light when the plurality of LEDs emits red light, display green light when the plurality of LEDs emits green light, and display blue light when the plurality of LEDs emits blue light, wherein the plurality of LEDs is arranged in an array comprising rows and columns, and wherein in each of the rows of LEDs and in each of the columns of LEDs, the red LEDs, the green LEDs and the blue LEDs are arranged in a repeated linearly aligned sequence of LEDs, wherein a time period during which the display panel is controlled to display red light is shorter than or equal to a time period during which the backlight module is controlled to emit red light, a time period during which the display panel is controlled to display green light is shorter than or equal to a time period during which the backlight module is controlled to emit green light, and a time period during which the display panel is controlled to display blue light is shorter than or equal to a time period during which the backlight module is controlled to emit blue light, wherein the linearly aligned sequence comprises a red LED immediately followed by one of:

A) a green LED immediately followed by a blue LED, and

B) a blue LED immediately followed by a green LED.

11. The display device according to claim 1, wherein the plurality of LEDs is arranged in at least two light-emitting areas.

12. The display device according to claim 11, wherein each of the at least two light-emitting areas at least comprises the red LED, the green LED and the blue LED.

\* \* \* \* \*